United States Patent [19]

Kregler et al.

[11] 4,118,080
[45] Oct. 3, 1978

[54] SEALED ANTIFRICTION BEARING WITH SEALING ELEMENT

[75] Inventors: Helmuth Kregler; Reinhard Hillmann, both of Schweinfurt, Germany

[73] Assignee: SKF Industries, Inc., King of Prussia, Pa.

[21] Appl. No.: 701,642

[22] Filed: Jul. 1, 1976

[30] Foreign Application Priority Data

Jul. 9, 1975 [DE] Fed. Rep. of Germany ... 7521787[U]

[51] Int. Cl.$^2$ ............................................. F16C 33/76
[52] U.S. Cl. ................................................. 308/187.1
[58] Field of Search .................. 308/187.1, 187, 187.2; 277/90, 91, 92, 94

[56] References Cited

U.S. PATENT DOCUMENTS

| | | | |
|---|---|---|---|
| 3,245,735 | 4/1966 | Sikora | 308/187.1 |
| 3,455,615 | 7/1969 | Stella | 308/187.1 |
| 3,458,207 | 7/1969 | Conti | 308/187.1 |
| 3,944,305 | 3/1976 | Asberg | 308/187.1 |

*Primary Examiner*—Richard A. Bertsch
*Attorney, Agent, or Firm*—Daniel M. Rosen

[57] ABSTRACT

An antifriction bearing has an inner race with a radially outward extending flange, an outer race, and rolling elements between the inner and outer races. The surface of the outer race toward the flange has a sealing lip, and an annular flexible resilient sealing element engages the lip and extends into sliding contact with the flange. The sealing element is held in place by a cylindrical casing radially surrounding the sealing element, the casing extending axially to form a narrow gap with the flange.

9 Claims, 1 Drawing Figure

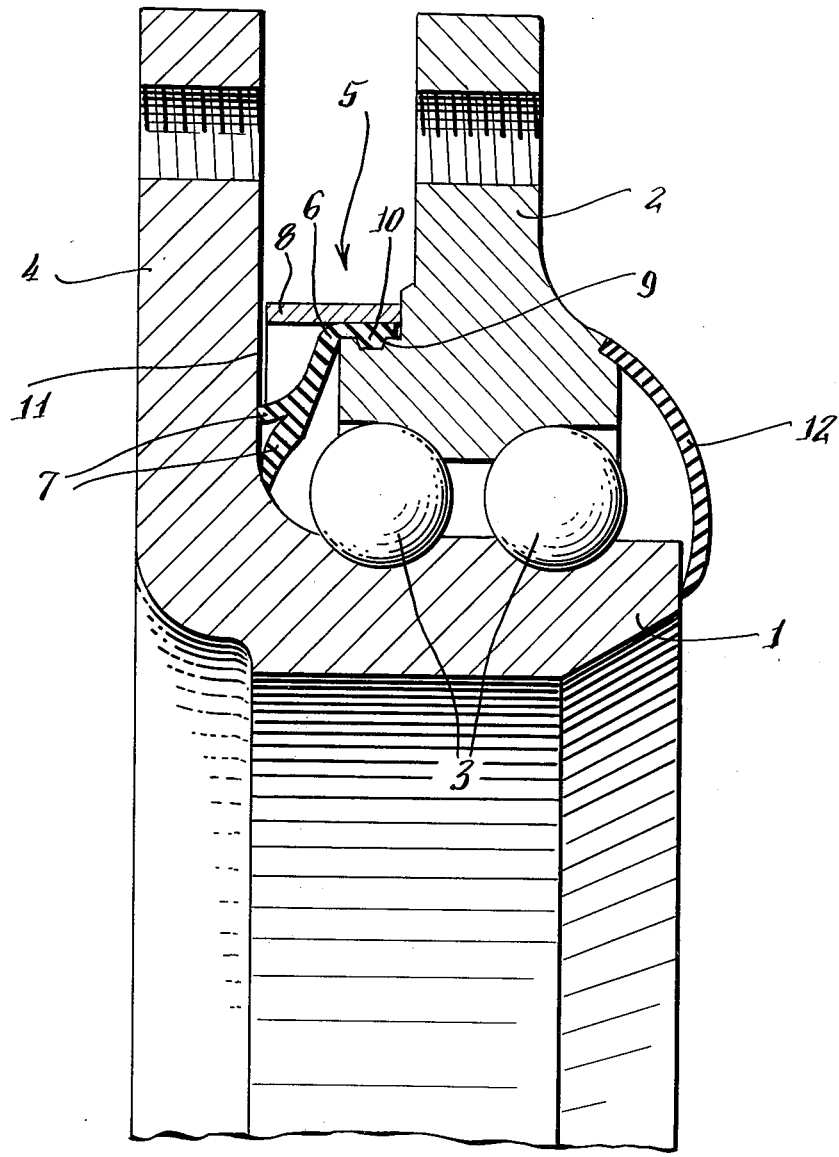

SEALED ANTIFRICTION BEARING WITH SEALING ELEMENT

BACKGROUND OF THE INVENTION

The present invention relates to sealed antifriction bearings, and particularly to such bearings with a sealing element positioned between and fastened to one of the inner and outer races. The free end of the seal slides along, and seals, the other race, with at least the inner race of the antifriction bearing being constructed in one piece with a fastening or supporting flange.

Prior art antifriction bearings with sealing elements feature a sealing element with a relatively rigid fastening section and an elastic and/or resilient sealing section with a sealing lip. The disadvantage of such known sealing elements lies in the rigidity necessary for the attachment of the fastening section; such rigidity can only be produced with difficulty, for example, by inverting the fastening section (made of elastic material), or by incorporating a circular spring. Assurance against spontaneous loosening of the sealing element from its seating is inadequate, since the fastening section can lift off the seating as a result of a blow or the effects of centrifugal force during operation. In addition, in the known sealing element, the sealing lip (such as in wheel bearings) is not protected from the impact of stones, and can thus be easily damaged.

The object of the present invention is to create a sealed antifriction bearing having a sealing element which overcomes the aforementioned disadvantages. It is a further object of the invention to provide an antifriction bearing seal which can be securely fastened to the race, and whose sealing lip is protected from damage by foreign bodies.

SUMMARY OF THE INVENTION

The foregoing objects are accomplished in novel fashion; the sealing element consists of an elastic and/or resilient sealing washer for example, made of rubber, equipped with one or more sliding sealing lips, and a rigid casing for example, made of steel which is axially fitted over the sealing washer and which extends far enough beyond the fastening side so that, together with the opposite fastening and supporting flange of the inner race, a narrow sealing gap is formed. This sealing gap thus precedes the sealing lip of the inner race, the lip lying further inward, and thus protects it from the impact of stones and from abrasion-causing foreign bodies.

According to a further characteristic of the invention, the casing is pressed onto the sealing on the fastening side so that the sealing washer, — whose bore surface pushes against a centering lip of the respective race, seats against this fastening side. In this manner, the sealing washer is pressed firmly by the rigid casing onto the seating surface of the centering lip, thus preventing loosening through shocks or centrigufal force of the sealing washer's seating on the centering lip.

According to a further characteristic of the invention, the centering lip possesses a ring-shaped groove into which the bore surface of the sealing washer is elastically pressed. Because of this, the elastic sealing washer is anchored into the centering lip, and the sealing element is securely fixed against axial displacement on the centering lip.

According to another characteristic of the invention, the rigid casing of the sealing element can be placed, without interposition of the elastic sealing washer, directly on the centering lip of the respective race, and can be fastened, for example, by a force fit. For economic production of the sealing element, the casing can be rolled and welded from band-shaped material such as a strip or steel band.

The novel sealing element herein described will be further clarified below by means of a more detailed description and sole FIGURE representing the preferred embodiment.

BRIEF DESCRIPTION OF THE FIGURE

The sole FIGURE shows a cross-section of an antifriction bearing equipped with the novel sealing element.

DETAILED DESCRIPTION OF THE PREFERRED EMBODIMENT

The antifriction bearing, for example, an automobile wheel bearing, consists of the inner race 1, the outer race 2 and between these the rolling elements such as balls 3. The inner race 1 includes on one side a fastening or supporting flange constructed in one piece, 4. Between the inner race 1 and the outer race 2 is mounted the novel sealing element 5. This sealing element 5, consists of the elastic and resilient sealing washer 6 with two sealing lips 7, and one rigid casing, housing or shell 8 which is fitted over the sealing washer and presses the sealing washer radially inward against a centering lip 9 of the outer race. A ring-shaped groove 10 is built into the centering lip 9, and the bore surface of the sealing washer 6 elastically engages this groove.

The two sealing lips 7 of the sealing washer 6 slide along or wipe the curved inner surfaces of the supporting flange 4 or wiping surface 4(a) to protect against the penetration of dust, dirt, or similar substances, and (b) to retain the lubricant between races 1 and 2. Above the two sealing lips 7 is located a narrow sealing gap 11 being formed between the end face of the casing 8 which points away from its fastening site, and the adjacent face of the fastening or supporting flange 4. On that side of the outer race 2 which lies opposite the side of the centering lip there is fastened a known sealing ring 12, which slides along the inner race 1, in order to protect the antifriction bearing even on the surface which is less exposed to dust, dirt, or similar substances.

The example which is illustrated may of course be altered and still continue to remain within the spirit and concept of the invention. Thus, the sealing element could, with suitable construction of the sealing washer and of the casing, also be fastened to the inner race, and could accordingly slide on the outer race. In this case, the sealing gap would be formed between the fastening or supporting flange of the outer race and the casing of the sealing element. Equally, in a modified design, the sealing element could, according to the invention, be built into both sides of the antifriction bearing.

Other examples, modifications, alterations, omissions or additions, will be apparent to those skilled in the art as being within the spirit and scope of the present invention.

What is claimed is:

1. In an antifriction bearing including inner and outer races and corresponding raceways and rolling elements in said raceways, the improvement in combination therewith of sealing means to protect said rolling elements and raceways, wherein said inner race comprises a supporting flange extending generally radially outward, and said outer race has a fastening edge adjacent and axially spaced from said supporting flange, said sealing means comprises an annular resilient sealing element having a first end engaging said fastening edge and an opposite free end formed as at least one sealing lip which slidably engages said supporting flange of said inner race, and a generally rigid cylindrical casing having a first end overlying said first end of the sealing element and securing same to said fastening edge and an opposite second end extending axially toward but not touching said supporting flange and defining therewith a narrow gap, said casing being radially outward of said sealing element for protecting same.

2. A bearing according to claim 1, wherein said fastening edge comprises an annular lip extending radially outward, said first end of said sealing element is pressed onto said edge over said lip, and said first end of the casing is pressed onto said first end of said sealing element.

3. A bearing according to claim 2, wherein said fastening edge further includes an annular groove axially inward of said lip, and said first end of the sealing element defines a bore surface that overlies said groove and lip.

4. A bearing according to claim 3, wherein said bore surface of the first end of said sealing element comprises an annular rib extending radially inward which is situated in said groove for preventing axial displacement of said sealing element relative to the fastening edge.

5. A bearing according to claim 1, wherein said outer race has a fastening edge adjacent and spaced from said supporting flange, and wherein said first end of the casing is fastened directly to said fastening edge, and said first end of said sealing element is secured between said first end of the casing and said fastening edge.

6. A bearing according to claim 1, wherein said casing comprises a rolled and welded strip of material.

7. A bearing according to claim 1, wherein said supporting flange and inner race comprise a single continuous member.

8. In an antifriction bearing including inner and outer races and corresponding raceways and rolling elements in said raceways, the improvement in combination therewith of sealing means to protect said rolling elements and raceways, wherein one of said races comprises a wiping surface and said other race has a fastening edge adjacent and spaced from said wiping surface, and said sealing means comprises an annular resilient sealing element having a first end engaging said fastening edge and an opposite free end formed as at least one sealing lip which slidably engages said wiping surface and a generally rigid cylindrical casing having a first end overlying and securing said first end of the sealing element to said fastening edge, and an opposite second end extending axially toward but not touching said wiping surface and defining therewith a narrow gap, said casing generally surrounding said sealing element for protecting same.

9. In a sealed antifriction bearing having an inner race, an outer race, and a plurality of rolling elements between said inner and outer races, and wherein one of said races has a flange extending radially to be axially spaced from one end of the other said race, the improvement comprising sealing means for said bearing, said sealing means comprising a lip on said one end of said other race, an annular resilient sealing element having a first end engaging said lip and an opposite free end formed as at least one sealing lip positioned to slidably engage said flange of said one race, and a rigid cylindrical casing having a first end radially engaging said sealing element at said lip on said one end of said other race for holding said sealing element to said other race, said casing extending axially toward but not touching said flange for defining therebetween a narrow gap, whereby said casing protects said sealing element.

* * * * *

UNITED STATES PATENT AND TRADEMARK OFFICE
CERTIFICATE OF CORRECTION

PATENT NO. : 4,118,080
DATED : October 3, 1978
INVENTOR(S) : Helmuth Kregler et al It is certified that error appears in the above-identified patent and that said Letters Patent are hereby corrected as shown below:

Column 1, line 52; before "whose", omit -- - --.

Signed and Sealed this

Sixth Day of February 1979

[SEAL]

Attest:

RUTH C. MASON
Attesting Officer

DONALD W. BANNER
Commissioner of Patents and Trademarks